United States Patent
Houck

(10) Patent No.: US 12,372,400 B2
(45) Date of Patent: Jul. 29, 2025

(54) OPTICAL SYSTEM

(71) Applicant: VIAVI Solutions Inc., Chandler, AZ (US)

(72) Inventor: William D. Houck, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 157 days.

(21) Appl. No.: 18/056,015

(22) Filed: Nov. 16, 2022

(65) Prior Publication Data

US 2023/0175889 A1 Jun. 8, 2023

Related U.S. Application Data

(60) Provisional application No. 63/264,985, filed on Dec. 6, 2021.

(51) Int. Cl.
*G01J 3/02* (2006.01)
*G01J 3/28* (2006.01)

(52) U.S. Cl.
CPC .......... *G01J 3/0294* (2013.01); *G01J 3/0208* (2013.01); *G01J 3/2823* (2013.01); *G01J 2003/2826* (2013.01); *G01J 2003/2836* (2013.01)

(58) Field of Classification Search
CPC ...... G01J 3/0294; G01J 3/0208; G01J 3/2823; G01J 3/26; G01J 2003/2826; G01J 2003/2836; G01J 2003/1226
See application file for complete search history.

(56) References Cited

U.S. PATENT DOCUMENTS

| | | | |
|---|---|---|---|
| 8,274,051 B1 * | 9/2012 | Aswell | H01L 31/02162 250/339.05 |
| 2015/0288894 A1 * | 10/2015 | Geelen | H04N 23/11 348/342 |
| 2021/0255543 A1 * | 8/2021 | Williams | G02B 5/201 |
| 2022/0012874 A1 * | 1/2022 | Maier-Hein | G06T 7/254 |

FOREIGN PATENT DOCUMENTS

| | | | | |
|---|---|---|---|---|
| EP | 2472853 A1 * | 7/2012 | | G03B 7/0997 |
| EP | 3187909 A1 * | 7/2017 | | G01J 3/0208 |
| FR | 2985856 A1 | 7/2013 | | |
| WO | 2011027260 A1 | 3/2011 | | |
| WO | 2021105398 A1 | 6/2021 | | |

OTHER PUBLICATIONS

Extended European Search Report for Application No. EP22211224.5, mailed on May 8, 2023, 16 pages.

\* cited by examiner

*Primary Examiner* — Kara E. Geisel
*Assistant Examiner* — Jonathon Cook
(74) *Attorney, Agent, or Firm* — FOLEY & LARDNER LLP

(57) ABSTRACT

An optical system includes a multispectral sensor; an optical filter including a plurality of optical channels that is disposed over the multispectral sensor; and a lens that is disposed over the optical filter. The lens is configured to direct first light that originates from a scene to the optical filter. The optical filter is configured to pass one or more portions of the first light to the multispectral sensor. The multispectral sensor is configured to generate, based on the one or more portions of the first light, spectral data associated with the scene.

20 Claims, 13 Drawing Sheets

US 12,372,400 B2

OPTICAL SYSTEM

RELATED APPLICATION

This application claims priority to U.S. Provisional Patent Application No. 63/264,985, entitled "OPTICAL SYSTEM," filed on Dec. 6, 2021, the content of which is incorporated by reference herein in its entirety.

BACKGROUND

An image capture device may include an image sensor and various components associated with the image sensor, such as a lens, an aperture, and/or a light source. One example of an image capture device is a user device, such as a smartphone or a tablet. An image capture device may provide various image capture modes, such as a portrait mode, a macro mode, and/or a panoramic mode, among other examples.

SUMMARY

In some implementations, an optical system includes a multispectral sensor including a plurality of multispectral sensor elements; an optical filter including a plurality of optical channels that is disposed over the multispectral sensor; a lens that is disposed over the optical filter; and an image sensor including a plurality of image sensor elements, wherein: the lens is configured to direct first light that originates from a scene to the optical filter, the optical filter is configured to pass one or more portions of the first light to the multispectral sensor, the multispectral sensor is configured to generate, based on the one or more portions of the first light, spectral data associated with the scene, and the image sensor is configured to generate image data based on second light that originates from the scene.

In some implementations, an optical system includes an optical filter including a plurality of optical channels that is disposed over a multispectral sensor; and a lens that is disposed over the optical filter, wherein: the lens is configured to direct first light that originates from a scene to the optical filter, the optical filter is configured to pass one or more portions of the first light to the multispectral sensor to permit the multispectral sensor to generate spectral data associated with the scene that can be used to determine white balance information associated with the scene.

In some implementations, an optical filter includes a plurality of optical channels that includes: a first set of one or more optical channels that are configured to have a first transmittance level that is greater than or equal to 90% for light associated with a spectral range; a second set of one or more optical channels that are configured to have a second transmittance level that is less than or equal to 7% for light associated with the spectral range; and a plurality of other sets of one or more optical channels, wherein a particular set of one or more optical channels, of the plurality of other sets of one or more optical channels, are configured to have a particular transmittance level that is greater than or equal to 20% for light associated with a particular spectral subrange of the spectral range.

DETAILED DESCRIPTION

Figure 1A:
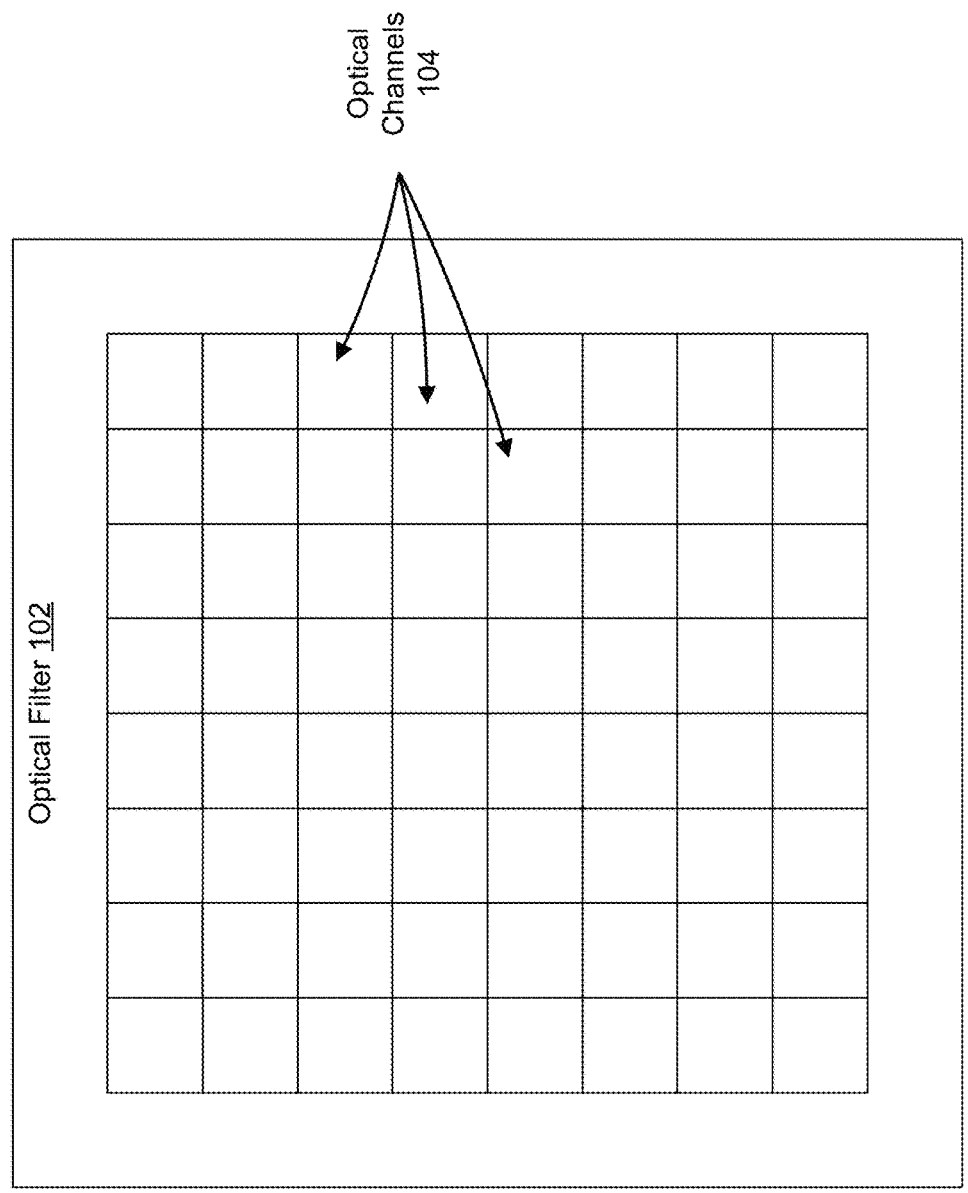
FIGS. 1A-1D are diagrams of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A multispectral sensor (e.g., of a spectrometer) captures multispectral data within specific wavelength ranges across the electromagnetic spectrum. This multispectral data may be useful for various purposes, such as chemical composition analysis of a material, determining an amount and/or type of light that is present at a particular area in a field of view of the multispectral sensor, and/or other examples. In some cases, the multispectral sensor can be used to perform hyperspectral imaging, which uses more spectral bands and/or a tighter grouping of spectral bands than is typically used with multispectral imaging. However, the terms "multispectral" and "hyperspectral" are used interchangeably for the purposes of the implementations described herein.

An image sensor captures image data associated with an image of a scene in the visible spectral range (e.g., for user consumption or for use with applications of a user device). In many cases, the image sensor may be associated with a camera of a user device, such as a mobile phone, a laptop, and/or a tablet, among other examples. A processor associated with the user device then processes the image data (e.g., using a global illumination color correction technique, such as an automatic white balancing (AWB) technique) to perform one or more color adjustment corrections and presents the image data (e.g., via a display of the user device) as an image that appears to be "color corrected" to a user of the user device. For example, the processor may use one or more AWB algorithms to automatically correct (e.g., with minimal input from a user of the user device) the image data based on ambient light (e.g., associated with the scene).

In some cases, when using an AWB technique to color, the processor of the user device estimates an illumination of the scene and performs, based on the estimated illumination, one or more color adjustment corrections on the image data. The processor can determine the estimated illumination based on user input (e.g., that indicates illumination conditions of the scene, such as an outside illumination condition, a cloudy illumination condition, an inside illumination condition, or another illumination condition), based on using software to analyze the image data of the image, and/or based on spectral data received from an ambient light sensor (e.g., that is included in or associated with the user device). However, these approaches may not accurately represent the illumination within the scene as captured by the camera of the user device (e.g., within a field of view (FOV) of the camera). Consequently, the processor of the user device often processes the image data of the image based on an incorrect, or non-representative, estimated illumination of the scene, which causes the processor to present the image data as an image that is inaccurately color corrected.

Some implementations described herein provide an optical system that includes a lens, an optical filter, a multispectral sensor, and/or one or more other optical components. In some implementations, the optical system includes an image sensor. The optical filter may be a multi-channel spectral filter and may be disposed on or adjacent to the multispectral sensor. The multispectral sensor may capture spectral data associated with the scene, such as when light (e.g., ambient light) from the scene is directed by the lens (and filtered by the optical filter) to the multispectral sensor. In some implementations, the multispectral sensor may be configured to be an ambient light sensor. The image sensor may capture image data associated with the scene, such as when other light (e.g., ambient light) from the scene is directed by the lens (or another lens of the optical system) to the image sensor.

In some implementations, the lens of the optical system may be configured to provide a same, or similar, FOV to the multispectral sensor as that of the image sensor. The lens may not need to focus light on the multispectral sensor, which allows the lens to be positioned anywhere in the optical system such that a size (e.g., a footprint) of the optical system is smaller than a size of a typical ambient light detection system. Accordingly, the optical system may be implemented within a user device, which may not be possible when using a typical ambient light detection system.

Further, in some implementations, the lens may be an imaging lens that includes a region (e.g., a focusing region, such as with a high modulation transfer function (MTF)) that provides focused light on the image sensor, and another region (e.g., a non-focusing region, such as with a low MTF) that provides unfocused light to the multispectral sensor (e.g., via the optical filter). In this way, the optical system uses unfocused light (e.g., to facilitate generation of spectral data) that would otherwise be blocked by a typical camera (e.g., to minimize an effect of unwanted light on an image sensor of the camera). The optical filter and the multispectral filter may also be disposed proximate to the imaging sensor within the optical system. In this way, an ambient light sensing functionality and imaging functionality may be combined into a single optical system, which reduces a size, a cost, and a complexity of the optical system as compared to using separate ambient light detection devices and image capturing devices to produce similar results.

In some implementations, the optical system may include a processor that processes the spectral data to determine white balance information associated with the scene. The white balance information may indicate an estimated illumination of the scene (e.g., by ambient light). The estimated illumination of the scene indicated by the white balance information is more accurate than that which would be determined using another illumination estimation technique (e.g., as described above), because the estimated illumination is based on the FOV of the multispectral sensor, which is the same as, or similar to, the FOV of the image sensor. Further, the optical filter may include a set of one or more "clear" optical channels (e.g., that pass light associated with a spectral range, such as the visible light range) and a set of one or more "darkened" optical channels (e.g., that block, or minimize passage of, light associated with the spectral range). Accordingly, the processor may identify portions of the spectral data that are associated with the set of one or more clear optical channels and the set of one or more darkened optical channels to normalize, denoise, and/or otherwise process the spectral data to generate white balance information that indicates a more accurate estimated illumination of the scene. Accordingly, the processor may process, based on the white balance information, the image data to generate a more accurate color corrected image (e.g., that is more accurate than a color corrected image generated using a less accurate estimated illumination).

In some implementations, the optical filter may be manufactured using a more efficient manufacturing process. For example, when the optical filter includes ten sets of one or more optical channels (e.g., a set of one or more clear optical channels, a set of one or more darkened optical channels, and eight sets of one or more narrow color range optical channels), a manufacturing process may be used that requires only five "spins" of a patterned lithography and thin film deposition process.

Figure 1B:
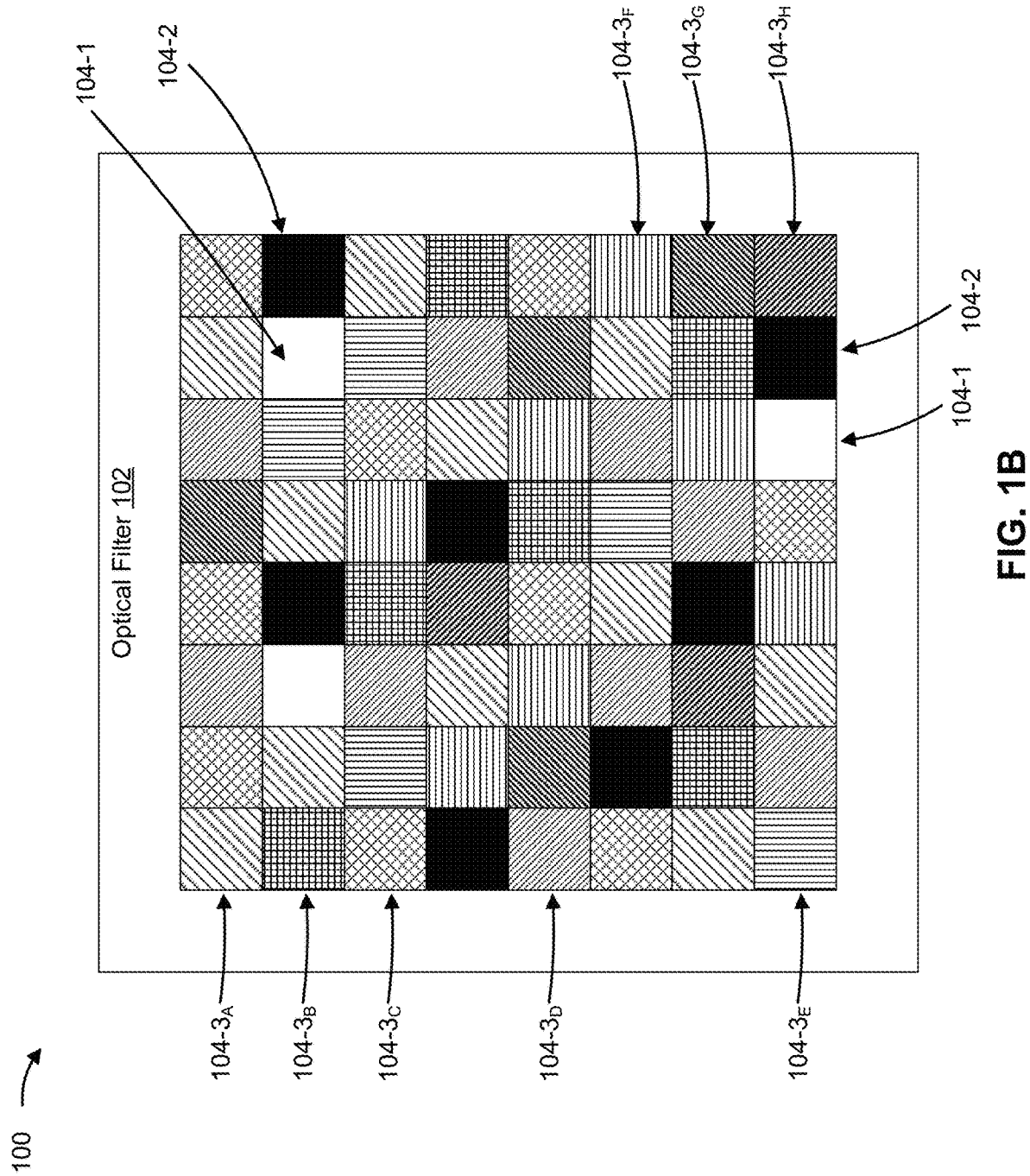
Figure 1C:
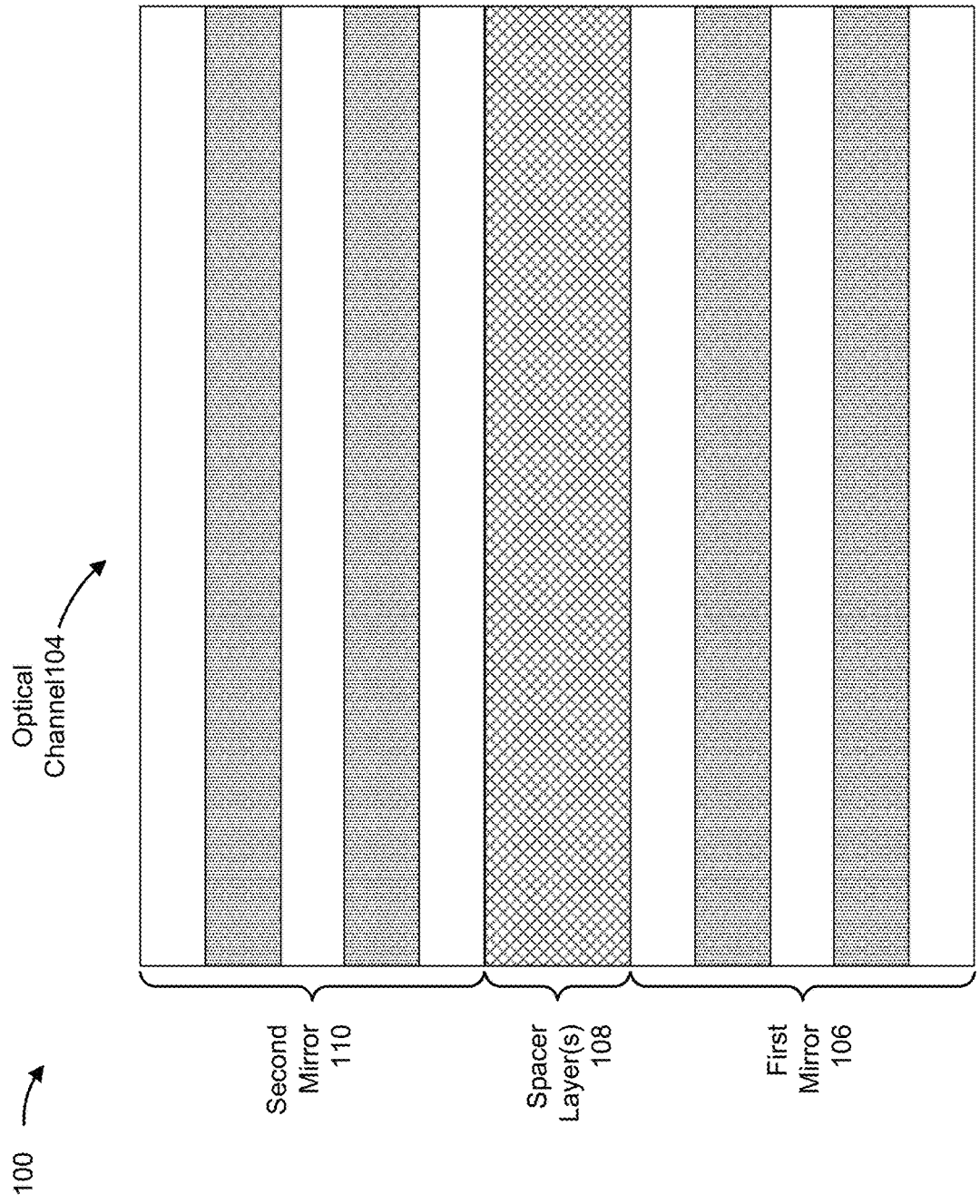
Figure 1D:
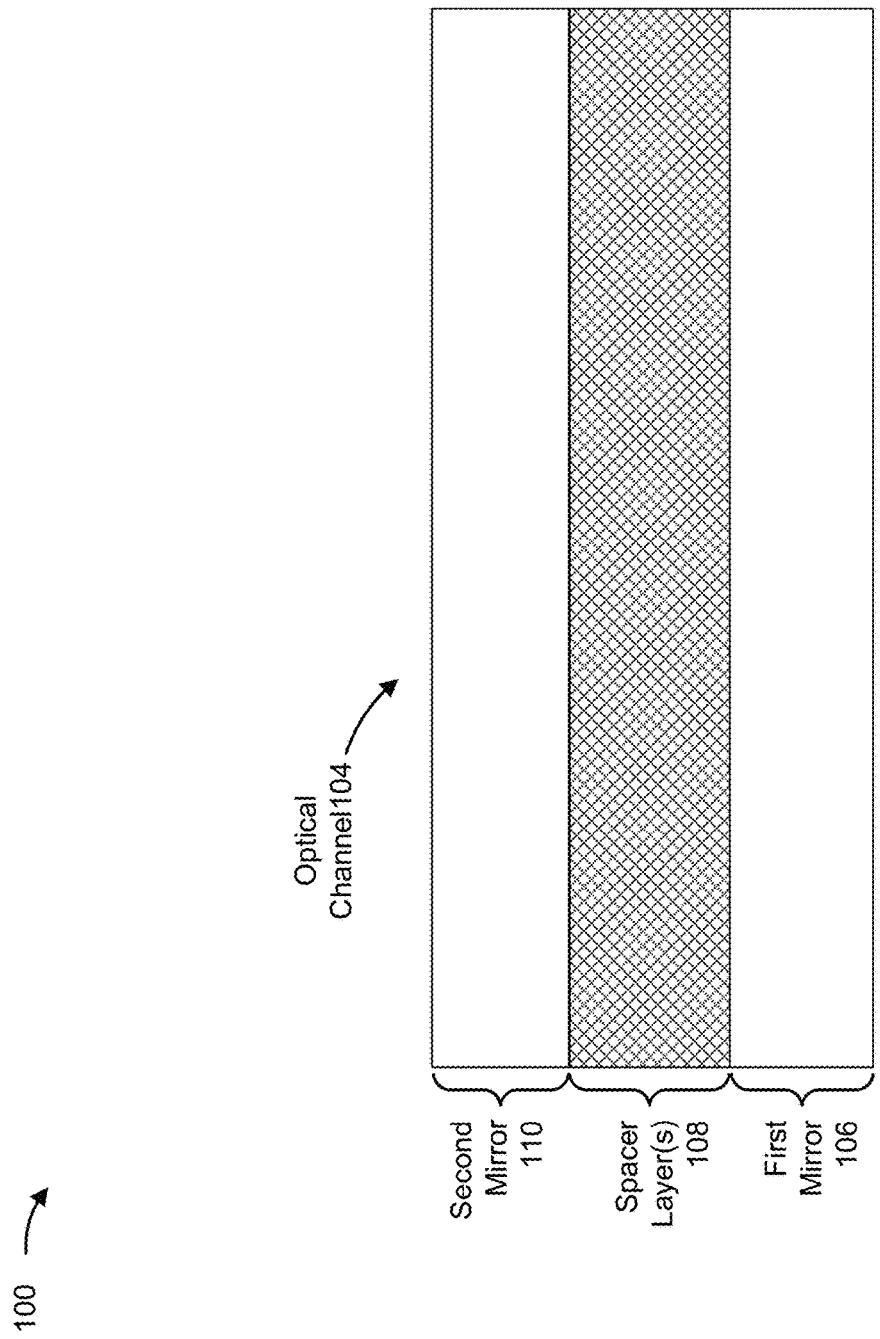

FIGS. 1A-1D are diagrams of an example implementation 100 described herein. As shown in FIG. 1A, example implementation 100 may include an optical filter 102 that includes a plurality of optical channels 104. FIG. 1A shows an input-side view of the optical filter 102; FIG. 1B shows an input-side view of the optical filter 102 in association with an example configuration of the plurality of optical channels 104; FIG. 1C shows a cross-sectional, side view of a first example configuration of an optical channel 104 of the plurality of optical channels 104; and FIG. 1D shows a cross-sectional, side view of a second example configuration of an optical channel 104.

As shown in FIG. 1A, the plurality of optical channels 104 may be arranged in a regular pattern, such as a two-dimensional pattern. In some implementations, the plurality of optical channels 104 may be arranged in a non-regular pattern, such as a spiral pattern. As further shown in FIG. 1A, each optical channel 104 may have a polygonal shape, such as a rectangular shape. In some implementations, each optical channel 104 may have a non-polygonal shape, such as a circular shape.

In some implementations, an optical channel 104, of the plurality of optical channels 104 may be configured to pass light associated with a spectral range (e.g., to pass light that has a wavelength that is greater than or equal to a lower bound of the spectral range and that is less than an upper bound of the spectral range). For example, the optical channel 104 may be configured to have a transmittance level that satisfies a "passing" transmittance level threshold for light associated with the spectral range. That is, the optical channel 104 may be configured to have a transmittance level that is greater than or equal to the passing transmittance level threshold for light associated with the spectral range, where the passing transmittance level threshold is greater than or equal to 20%, 35%, 50%, 65%, 75%, 85%, 90%, 95%, or 99%, among other examples (and less than or equal to 100%). The spectral range may be, for example, one or more portions of a visible spectral range (e.g., greater than or equal to 420 nanometers (nm) and less than 780 nm) and/or another spectral range, such as a near-infrared (NIR) spectral range (e.g., greater than or equal to 780 nm and less than 1000 nm), and/or an ultraviolet (UV) spectral range (e.g., greater than or equal to 100 nm and less than 420 nm).

Additionally, or alternatively, an optical channel 104, of the plurality of optical channels 104, may be configured to block (or minimize passage of) light associated with a spectral range (e.g., to block or minimize passage of light that has a wavelength that is greater than or equal to a lower bound of the spectral range and that is less than an upper bound of the spectral range). For example, the optical channel 104 may be configured to have a transmittance level that satisfies a "blocking" transmittance level threshold for light associated with the spectral range. That is, the optical channel 104 may be configured to have a transmittance level that is less than or equal to the blocking transmittance level threshold for light associated with the spectral range, where the transmittance level threshold is less than or equal to 1%, 3%, 5%, 7%, 10%, 15%, 20%, 35%, or 50%, among other examples (and greater than or equal to 0%).

In some implementations, the plurality of optical channels 104 may include a first set of one or more optical channels 104-1 that are associated with passing light associated with a spectral range (e.g., one or more "clear" optical channels 104-1), a second set of one or more optical channels 104-2 that are associated with blocking (or minimizing passage of) light associated with the spectral range (e.g., one or more "darkened" optical channels 104-2), and/or a plurality of other sets of one or more optical channels 104-3 that are associated with passing light associated with respective spectral subranges of the spectral range.

For example, the first set of one or more optical channels 104-1 may be configured to have a first transmittance level that satisfies (e.g., is greater than or equal to) a first transmittance level threshold (e.g., that is greater than or equal to 50%, 65%, 75%, 85%, 90%, 95%, or 99%, among other examples) for light associated with the spectral range. The second set of one or more optical channels 104-2 may be configured to have a second transmittance level that satisfies (e.g., is less than or equal to) a second transmittance level threshold (e.g., that is less than or equal to 1%, 3%, 5%, 7%, 10%, 15%, 20%, 35%, or 50%, among other examples) for light associated with the spectral range. A particular set of one or more optical channels 104-3, of the plurality of other sets of one or more optical channels 104-3, may be configured to have a particular transmittance level that satisfies (e.g., is greater than or equal to) another transmittance level threshold (e.g., that is greater than or equal to 50%, 65%, 75%, 85%, 90%, 95%, or 99%, among other examples) for light associated with a particular spectral subrange of the spectral range.

FIG. 1B shows an example configuration of the plurality of optical channels 104 when the plurality of optical channels 104 include the first set of one or more optical channels 104-1, the second set of one or more optical channels 104-2, and the plurality of other sets of one or more optical channels 104-3 (shown as eight sets of one or more optical channels 104-3A through 104-3H). Accordingly, each optical channel 104-1 may be associated with passing light associated with the spectral range (e.g., as indicated by no shading and no patterning) and each optical channel 104-2 may be associated with blocking (or minimizing passage of) light associated with the spectral range (e.g., as indicated by black shading). Each optical channel 104-3 may be associated with passing light associated with a particular spectral subrange of the spectral range (e.g., as indicated by particular patterning). That is, each optical channel 104-3 may be associated with passing light associated with a particular "color." For example, each optical channel 104-3A may be associated with passing light associated with a first spectral subrange of the spectral range (e.g., as indicated by broad, left-to-right diagonal patterning), 104-3 may be associated with passing light associated with a second spectral subrange of the spectral range (e.g., as indicated by grid patterning), 104-3c may be associated with passing light associated with a third spectral subrange of the spectral range (e.g., as indicated by diamond patterning), and so on.

As further shown in FIG. 1B, the first set of one or more optical channels 104-1, the second set of one or more optical channels 104-2, and the plurality of other sets of one or more optical channels 104-3 may be arranged in a non-periodic, two-dimensional pattern. For example, each optical channel 104-1, each optical channel 104-2, and each optical channel 104-3 may be arranged in a random, or pseudo-random, position within the two-dimensional pattern of the plurality of optical channels 104. In some implementations, the first set of one or more optical channels 104-1, the second set of one or more optical channels 104-2, and the plurality of other sets of one or more optical channels 104-3 may be arranged in a periodic (e.g., a non-random), two-dimensional pattern, or another type of pattern.

FIGS. 1C-1D are diagrams of example configurations of an optical channel 104 described herein. As shown in FIGS. 1C-1D, the optical channel 104 may include a first mirror 106, one or more spacer layers 108, and/or a second mirror 110. As shown in FIG. 1C, the first mirror 106 and/or the second mirror 110 may each include a dielectric mirror. For example, the first mirror 106 and/or the second mirror 110 may each include a set of alternating dielectric layers, such as an alternating set of layers comprising at least a hydrogenated silicon (Si:H) material and a set of layers comprising at least a silicon dioxide ($SiO_2$) material. Alternatively, as shown in FIG. 1D, the first mirror 106 and/or the second mirror 110 may each include a metallic mirror, such as comprising at least a silver (Ag) material.

As further shown in FIGS. 1C-1D, the one or more spacer layers 108 may be disposed between the first mirror 106 and the second mirror 110 (e.g., the one or more spacer layers 108 may be disposed on the first mirror 106, and the second mirror 110 may be disposed on the one or more spacer layers 108). The one or more spacer layers 108 may comprise, for example, at least an oxide material (e.g. a niobium-titanium-oxide ($NbTiO_x$) material, a niobium oxide ($NbO_x$) material, a titanium oxide ($TiO_x$) material, and/or tantalum oxide ($TaO_x$) material), a nitride material (e.g., that includes a silicon nitride (SiN) material and/or an aluminum nitride (AlN) material), a silicon material (e.g., that includes a silicon and hydrogen (SiH) material, a hydrogenated silicon (Si:H) material, a silicon carbide (SiC) material, and/or a silicon (Si) material), and/or a germanium (Ge) material. In some implementations, a thickness of the one or more spacer layers 108 may be configured to provide a particular distance between the first mirror 106 and the second mirror 110, such as to cause the optical channel 104 to pass light associated with a spectral range (or a spectral subrange), or, alternatively, to cause the optical channel 104 to block (or minimize passage of) light associated with the spectral range (or the spectral subrange), as described elsewhere herein.

While some implementations described herein provide specific examples of the optical filter 102, the optical filter 102 may be any type of optical filter. For example, the optical filter 102 may be a spectral filter, a multispectral filter, an optical interference filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, glasses, and/or the like), and/or another type of optical filter.

As indicated above, FIGS. 1A-1D are provided as examples. Other examples may differ from what is described with regard to FIGS. 1A-1D.

Figure 2A:
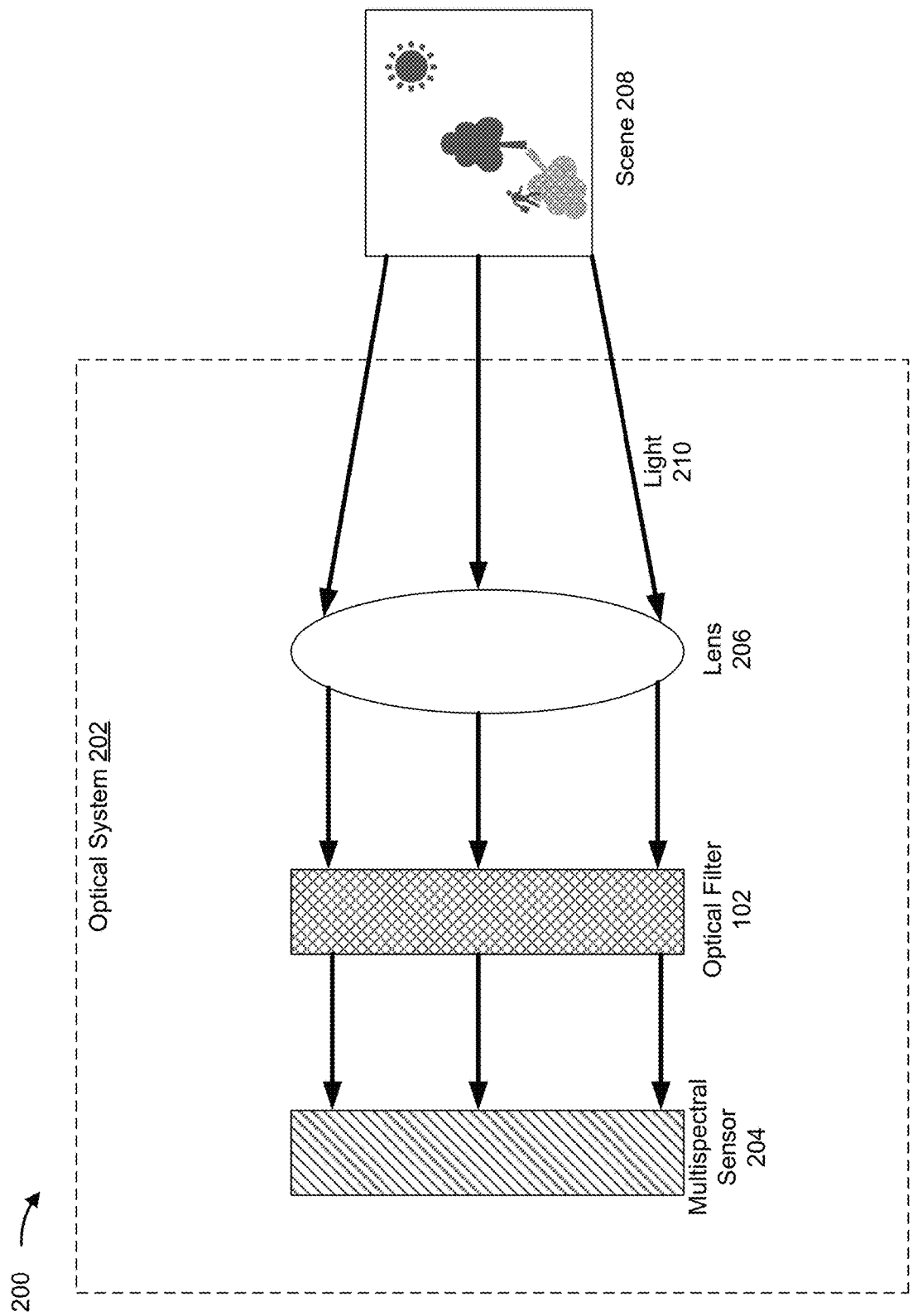
FIGS. 2A-2C are diagrams of an example implementation described herein.
Figure 2B:
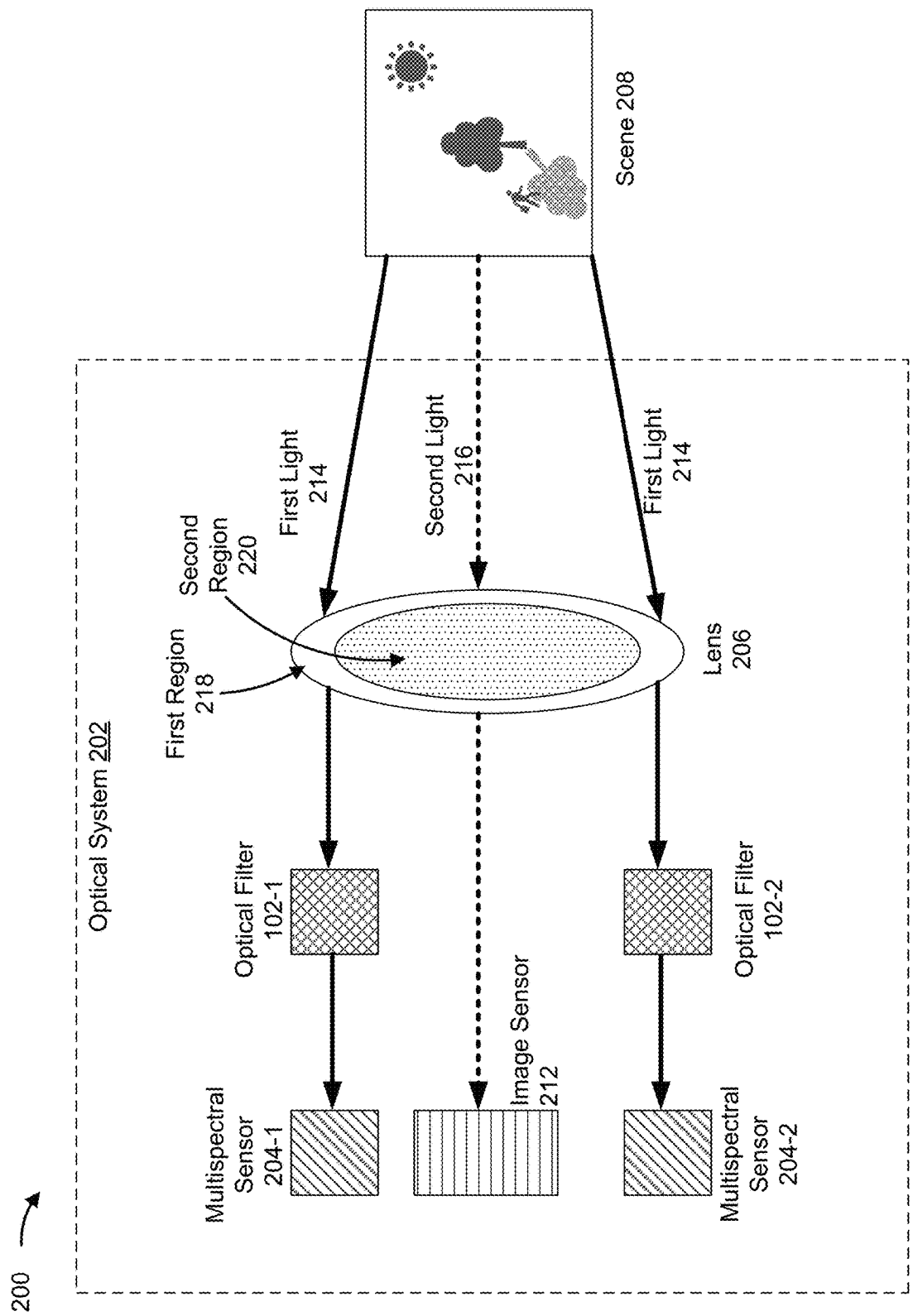
Figure 2C:
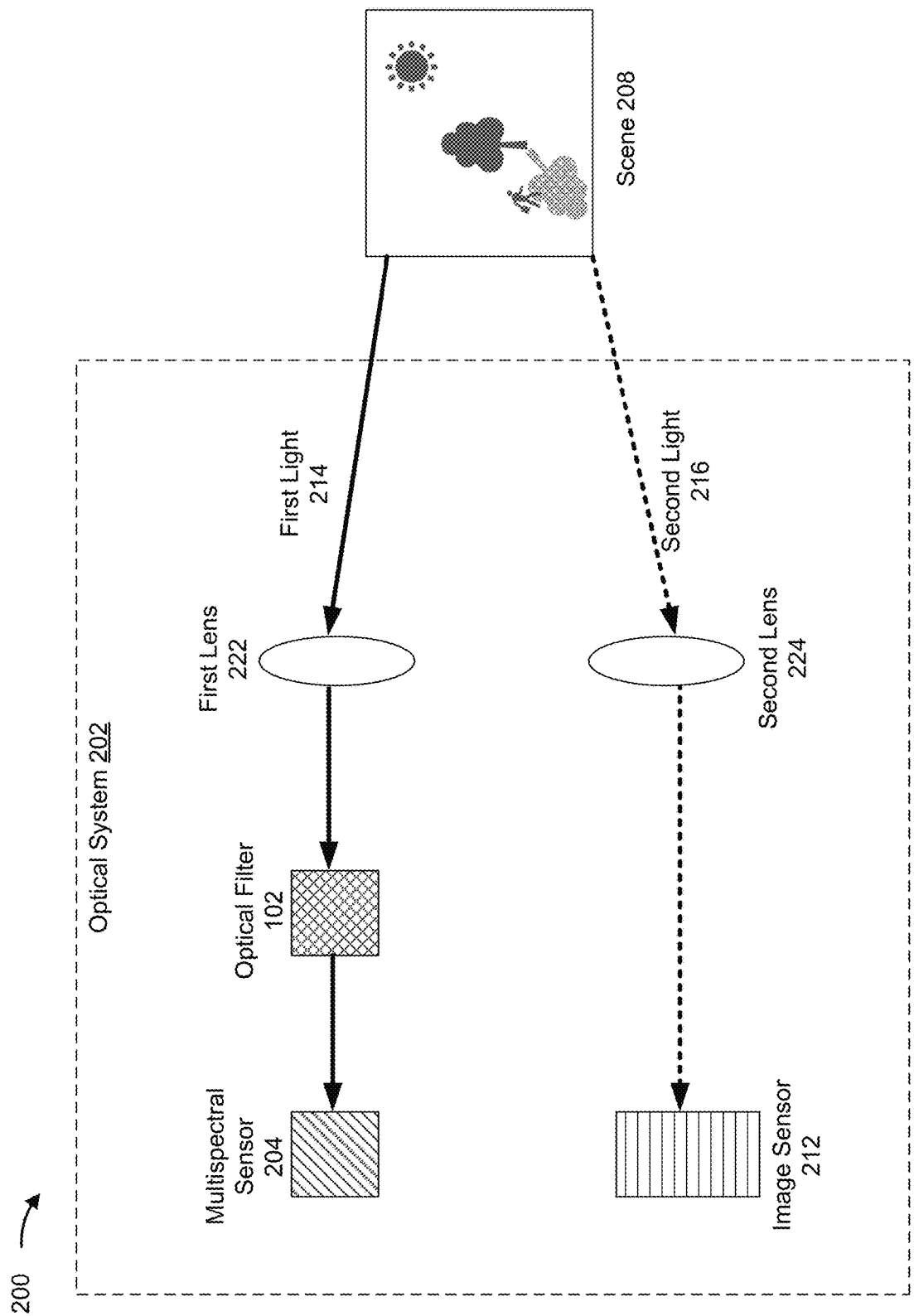

FIGS. 2A-2C are diagrams of an example implementation 200 described herein. As shown in FIG. 1A, example implementation 200 may include an optical system 202. The optical system 202 may be associated with, and/or may be included in, a user device (e.g., a user device 450, as described herein). FIGS. 2A-2C each show a different configuration of the optical system 202.

As shown in FIG. 2A, the optical system 202 may include a multispectral sensor 204, the optical filter 102, and/or a lens 206. The optical system 202 may be configured to collect and process light 210 that originates from a scene 208. The scene 208 may include variations in local illumination (e.g., the scene 208 includes an area associated with a tree illuminated by sunlight, an area associated with a shadow cast by the tree, and an area associated with a person walking by the tree with a part of the person illuminated by the sunlight and another part of the person in the shadow of the tree).

The multispectral sensor 204 may include a plurality of multispectral sensor elements (not shown). The plurality of multispectral sensor elements may provide information related to light (e.g., the light 210) that impinges on the plurality of multispectral sensor elements. For example, an individual multispectral sensor element, of the plurality of multispectral sensor elements, may provide an indication of intensity of light that impinges on the multispectral sensor element (e.g., active/inactive, or a more granular indication of intensity). As another example, the multispectral sensor element may provide an indication of a wavelength or wavelength range of light that impinges on the multispectral sensor element (e.g., red light, blue light, green light, ultraviolet light, and/or infrared light, among other examples). The multispectral sensor 204 may be configured to collect respective information from individual multispectral sensor elements, of the plurality of multispectral sensor elements, to generate spectral data. For example, the multispectral sensor 204 may be configured to generate spectral data associated with the scene 208 (e.g., that indicates a spectral profile of the scene 208). The spectral data may include spectral information about light associated with a spectral range (e.g., one or more portions of the visible spectral range and/or another spectral range).

The optical filter 102 may be disposed over the multispectral sensor 204. For example, the optical filter 102 may be disposed directly on an input surface of the multispectral sensor 204. Alternatively, the optical filter 102 may be disposed proximate to the input surface of the multispectral sensor 204, and a gap (e.g., an air gap, or a gap comprising one or more materials) may separate the optical filter 102 and the input surface of the multispectral sensor 204. The optical filter 102 may be configured to pass one or more portions of light (e.g., that impinges on the input surface of the optical filter 102) to the multispectral sensor 204 (e.g., the input surface of the multispectral sensor 204) and/or may be configured to block (or minimize passage of) one or more other portions of the light (e.g., that impinges on the input surface of the optical filter 102). For example, the optical filter 102 may be configured to pass one or more portions of the light 210 to the multispectral sensor 204 and/or to block (or minimize passage of) one or more other portions of the light 210.

The lens 206 may be disposed over the optical filter 102. For example, the lens 206 may be disposed directly on the input surface of the optical filter 102. Alternatively, the lens 206 may be disposed proximate to the input surface of the optical filter 102, and a gap (e.g., an air gap, or a gap comprising one or more materials) may separate the lens 206 and the input surface of the optical filter 102. The lens 206 may be configured to receive light and to direct the light to the optical filter 102. For example, the lens 206 may be configured to receive the light 210 from the scene 208 and to direct the light 210 to the input surface of the optical filter 102. The lens 206 may be configured to collimate, converge, diverge, and/or otherwise direct light to the optical filter 102. In some implementations, the lens 206 may be a "non-imaging" lens (e.g., that is associated with a low MTF), and may therefore not be configured to focus the light on the optical filter 102. This may enable the lens 206 to be thinner (as compared to an "imaging" lens that is associated with a high MIT) and/or to reduce a thickness of a gap between the lens 206 and the optical filter 102. The lens 206 may comprise glass, plastic, and/or a similar material.

Accordingly, as shown in FIG. 2A, the light 210 may originate from the scene 208 and may propagate to the lens 206. The lens 206 may direct the light 210 to the optical filter 102. The optical filter 102 may pass one or more portions of the light to the multispectral sensor 204 and/or may block (or minimize passage of) one or more other portions of the light 210. The multispectral sensor 204 may generate, based on the one or more portions of the light 210, spectra data associated with the scene 208. The spectral data then may be used to determine white balance information associated with the scene 208 (e.g., as described herein).

As shown in FIG. 2B, the optical system 202 may additionally include an image sensor 212. As further shown in FIG. 2B, the multispectral sensor 204 and the optical filter 102 may each be divided into one or more portions (e.g., that are arranged proximate to the image sensor 212, such as around one or more sides of the image sensor 212). For example, the multispectral sensor 204 may be divided into a first multispectral sensor portion 204-1 and a second multispectral sensor portion 204-2, and the optical filter 102 may be divided into a first optical filter portion 102-1 and a second optical filter portion 102-2. Accordingly, the optical system 202 may be configured to collect and process first light 214 and second light 216 that originate from the scene 208, as described herein.

The image sensor 212 may include a plurality of image sensor elements (not shown). The plurality of image sensor elements may provide information related to light that impinges on the plurality of image sensor elements. For example, an individual image sensor element, of the plurality of image sensor elements, may provide an indication of intensity of light that impinges on the image sensor element (e.g., active/inactive, or a more granular indication of intensity). As another example, the image sensor element may provide an indication of a wavelength or wavelength range of light that impinges on the image sensor element (e.g., red light, blue light, green light, ultraviolet light, and/or infrared light, among other examples). The image sensor 212 may be configured to collect respective information from individual image sensor elements, of the plurality of image sensor elements, to generate image data. For example, the image sensor 212 may be configured to generate image data associated with the scene 208. The image data may include image information about light associated with a spectral range (e.g., the visible spectral range and/or another spectral range), such as an amount and/or location of red light, green light, and/or blue light in the scene 208.

In some implementations, the lens 206 may include a first region 218 (e.g., an outer region of the lens 206, such as a perimeter region of the lens 206 that is not associated with an imaging region of the lens 206) and a second region 220 (e.g., an inner region of the lens 206, such as a central region of the lens 206 that is associated with the imaging region of the lens 206). The lens 206 may be disposed over (e.g., directly on, or separated by a gap) the one or more portions of the optical filter 102, and the first region 218 of the lens 206 may be configured to receive the first light 214 and to direct the first light 214 to the one or more portions of the optical filter 102. Additionally, or alternatively, the lens 206 may be disposed over (e.g., directly on, or separated by a gap) the image sensor 212, and the second region 220 of the lens 206 may be configured to receive the second light 216 and to direct the second light 216 to the image sensor 212. In this way, a single lens 206 may direct light associated with the scene 208 that is to be imaged to the image sensor 212, and may direct other light associated with the scene 208 that is to be analyzed (e.g., to determine white balance information associated with the scene 208) to the multispectral sensor 204 via the optical filter 102. In some implementations, the lens 206 may be an "imaging" lens (e.g., that is associated with a high MTF), and may therefore be configured to provide the second light 216 as focused light on the multispectral sensor 204 and to provide the first light 214 as non-focused light on the optical filter 102.

Accordingly, as shown in FIG. 2B, the first light 214 and the second light 216 may originate from the scene 208 and may propagate to the first region 218 and the second region 220 of the lens 206, respectively. The first region 218 of the lens 206 may direct the first light 214 to the one or more portions of the optical filter 102. Each of the one or more portions of the optical filter 102 may pass one or more portions of the first light 214 to a corresponding portion of the multispectral sensor 204 and/or may block (or minimize passage of) one or more other portions of the first light 214. The multispectral sensor 204 may generate, based on the one or more portions of the first light 214, spectral data associated with the scene 208. The spectral data then may be used to determine white balance information associated with the scene 208 (e.g., as described herein). Additionally, the second region 220 of the lens 206 may direct the second light 216 to the image sensor 212. The image sensor 212 may generate, based on the second light 216, image data associated with the scene 208. The image data then may be used to generate (e.g., based on the white balance information) an image of the scene 208 (e.g., as described herein).

As shown in FIG. 2C, the optical system 202 may include a first lens 222 and a second lens 224, instead of a single lens 206. In this way, the first light 214 and the second light that originate from the scene 208 may propagate to different lenses in the optical system 202.

The first lens 222 may be disposed over (e.g., directly on, or separated by a gap) the optical filter 102, and may be configured to receive the first light 214 and to direct the first light 214 to the optical filter 102 (e.g., in a similar manner as that of the lens 206 described herein in relation to FIG. 2A). In some implementations, the first lens 222 may be a "non-imaging" lens (e.g., that is associated with a low MTF), and may therefore be configured to provide the first light 214 as non-focused light on the optical filter 102.

The second lens 224 may be disposed over (e.g., directly on, or separated by a gap) the image sensor 212, and may be configured to receive the second light 216 and to direct the second light 216 to the image sensor 212 (e.g., in a similar manner as that of the lens 206 described herein in relation to FIG. 2B). In some implementations, the second lens 224 may be an "imaging" lens (e.g., that is associated with a high MTF), and may therefore be configured to provide the second light 216 as focused light on the image sensor 212.

Accordingly, as shown in FIG. 2C, the first light 214 and the second light 216 may originate from the scene 208 and may propagate to the first lens 222 and the second lens 224, respectively. The first lens 222 may direct the first light 214 to the optical filter 102. The optical filter 102 may pass one or more portions of the first light 214 to the multispectral sensor 204 and/or may block (or minimize passage of) one or more other portions of the first light 214. The multispectral sensor 204 may generate, based on the one or more portions of the first light 214, spectral data associated with the scene 208. The spectral data then may be used to determine white balance information associated with the scene 208 (e.g., as described herein). Additionally, the second lens 224 may direct the second light 216 to the image sensor 212. The image sensor 212 may generate, based on the second light 216, image data associated with the scene 208. The image data then may be used to generate (e.g., based on the white balance information) an image of the scene 208 (e.g., as described herein).

As indicated above, FIGS. 2A-2C are provided as examples. Other examples may differ from what is described with regard to FIGS. 2A-2C.

Figure 3A:
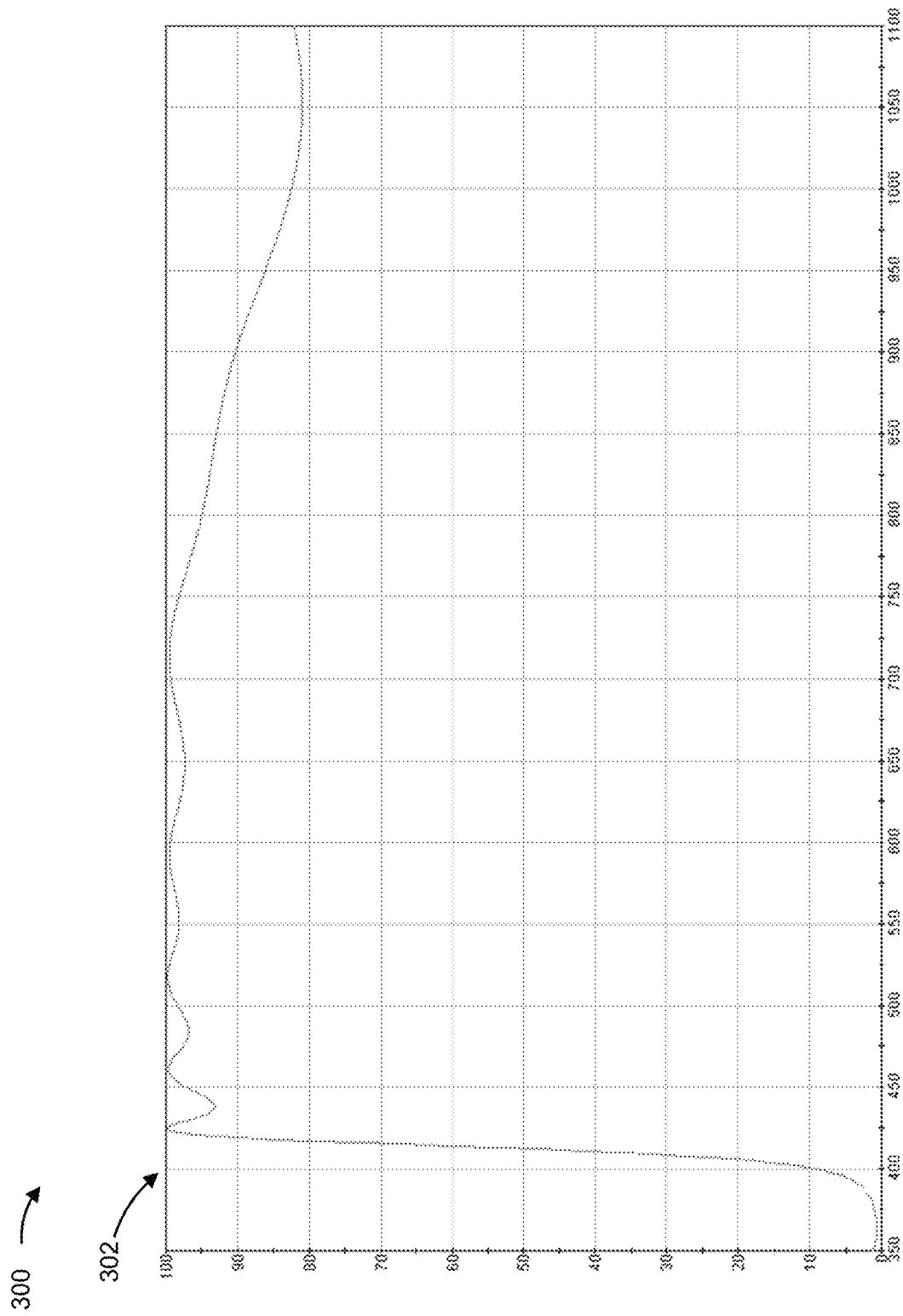
FIGS. 3A-3C are diagrams of example transmission plots associated with an optical filter described herein.
Figure 3B:
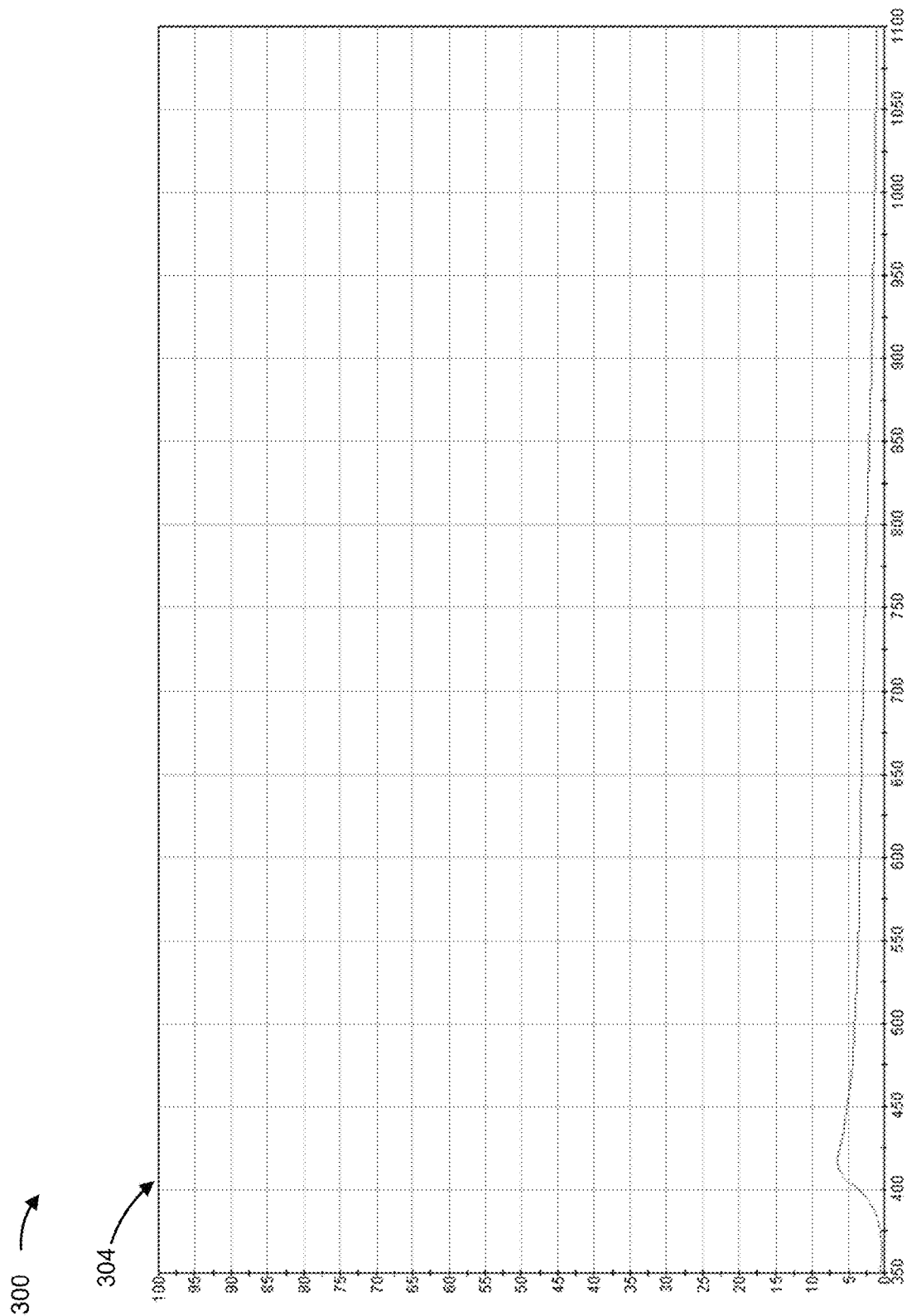
Figure 3C:
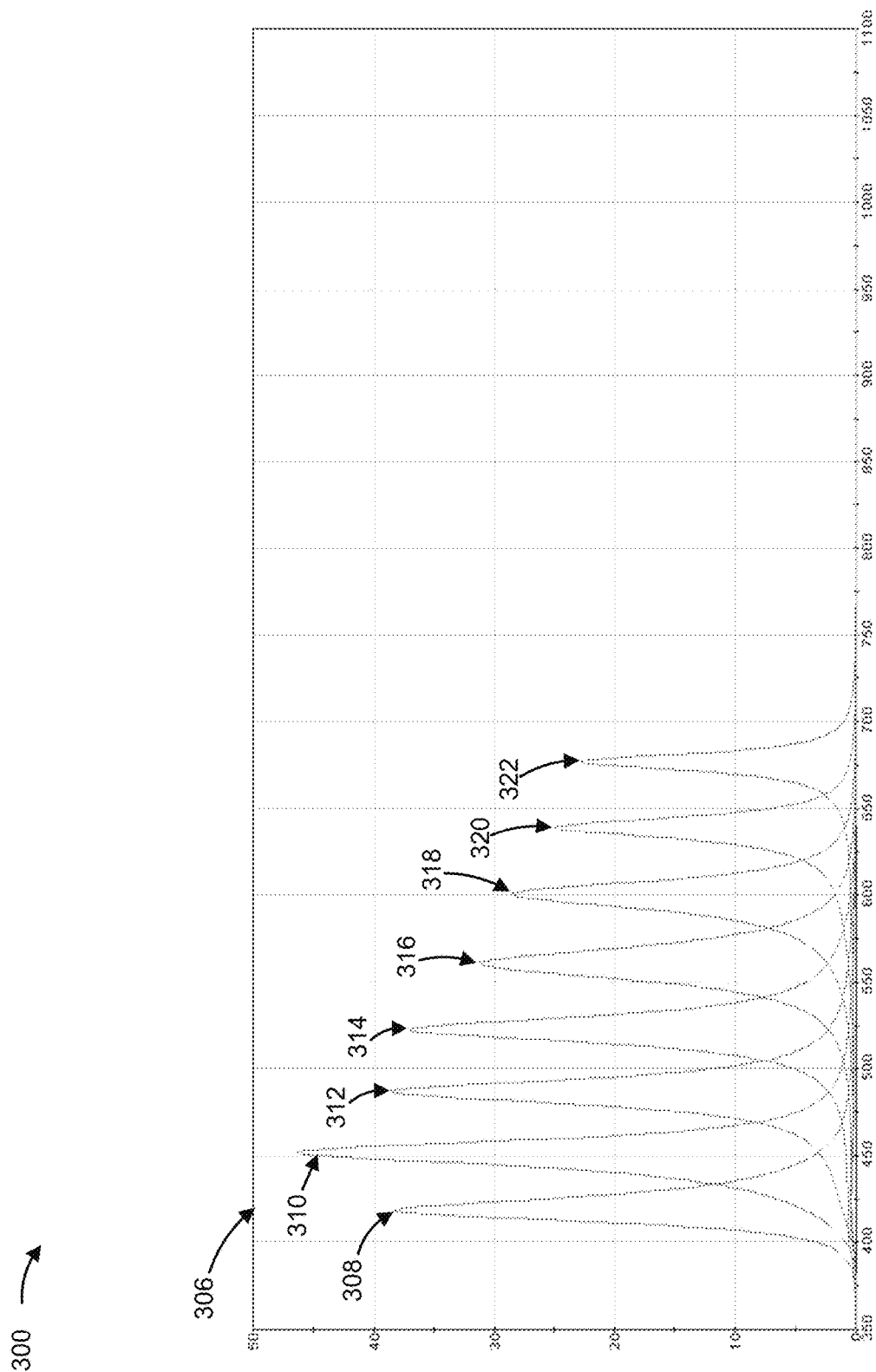

FIGS. 3A-3C are diagrams 300 of example transmission plots associated with the optical filter 102 described herein.

FIG. 3A shows an example transmission plot 302 for a "clear" optical channel 104-1 of the optical filter 102 that is configured to pass light associated with a spectral range. Here, the transmission plot 302 indicates that the optical channel 104-1 has a transmission level that is greater than or equal to 90% for light associated with the visible spectral range (e.g., greater than or equal to 420 nm and less than 780 nm) and a portion of the NIR spectral range (e.g., greater than or equal to 780 nm and less than 900 nm).

FIG. 3B shows an example transmission plot 304 for a "darkened" optical channel 104-2 of the optical filter 102 that is configured to block (or minimize passage of) light associated with a spectral range. Here, the transmission plot 304 indicates that the optical channel 104-2 has a transmission level that is less than or equal to 7% for light associated with a portion of the UV spectral range (e.g., greater than or equal to 350 nm and less than 420 nm), the visible spectral range (e.g., greater than or equal to 420 nm and less than 780 nm) and the NIR spectral range (e.g., greater than or equal to 780 nm and less than 1000 nm).

FIG. 3C shows an example transmission plot 306 for optical channels 104-3 that are configured to pass light associated with spectral subranges of a spectral range. Here, the transmission plot 306 indicates that the optical channels 104-3 have transmission levels that are greater than or equal to 20% for light associated with different spectral subranges of the visible spectral range (e.g., greater than or equal to 420 nm and less than 780 nm). For example, as shown by curve 308, a first optical channel 104-3 (e.g., that corresponds to optical channel 104-3A in FIG. 1B) has a transmission level that is greater than or equal to 20% for a first spectral subrange (e.g., greater than or equal to 420 nm and less than 430 nm); as shown by curve 310, a second optical channel 104-3 (e.g., that corresponds to optical channel 104-3B in FIG. 1B) has a transmission level that is greater than or equal to 20% for a second spectral subrange (e.g., greater than or equal to 440 nm and less than 460 nm); as shown by curve 312, a third optical channel 104-3 (e.g., that corresponds to optical channel 104-3c in FIG. 1B) has a transmission level that is greater than or equal to 20% for a third spectral subrange (e.g., greater than or equal to 470 nm and less than 490 nm); as shown by curve 314, a fourth optical channel 104-3 (e.g., that corresponds to optical channel 104-3b in FIG. 1B) has a transmission level that is greater than or equal to 20% for a fourth spectral subrange (e.g., greater than or equal to 515 nm and less than 535 nm); as shown by curve 316, a fifth optical channel 104-3 (e.g., that corresponds to optical channel 104-3E in FIG. 1B) has a transmission level that is greater than or equal to 20% for a fifth spectral subrange (e.g., greater than or equal to 555 nm and less than 575 nm); as shown by curve 318, a sixth optical channel 104-3 (e.g., that corresponds to optical channel 104-3F in FIG. 1B) has a transmission level that is greater than or equal to 20% for a sixth spectral subrange (e.g., greater than or equal to 595 nm and less than 605 nm); as shown by curve 320, a seventh optical channel 104-3 (e.g., that corresponds to optical channel 104-3$_G$ in FIG. 1B) has a transmission level that is greater than or equal to 20% for a seventh spectral subrange (e.g., greater than or equal to 630 nm and less than 640 nm); and as shown by curve 322, an eighth optical channel 104-3 (e.g., that corresponds to optical channel 104-3H in FIG. 1) has a transmission level that is greater than or equal to 20% for a eighth spectral subrange (e.g., greater than or equal to 675 nm and less than 680 nm).

As indicated above, FIGS. 3A-3C are provided as examples. Other examples may differ from what is described with regard to FIGS. 3A-3C.

Figure 4:
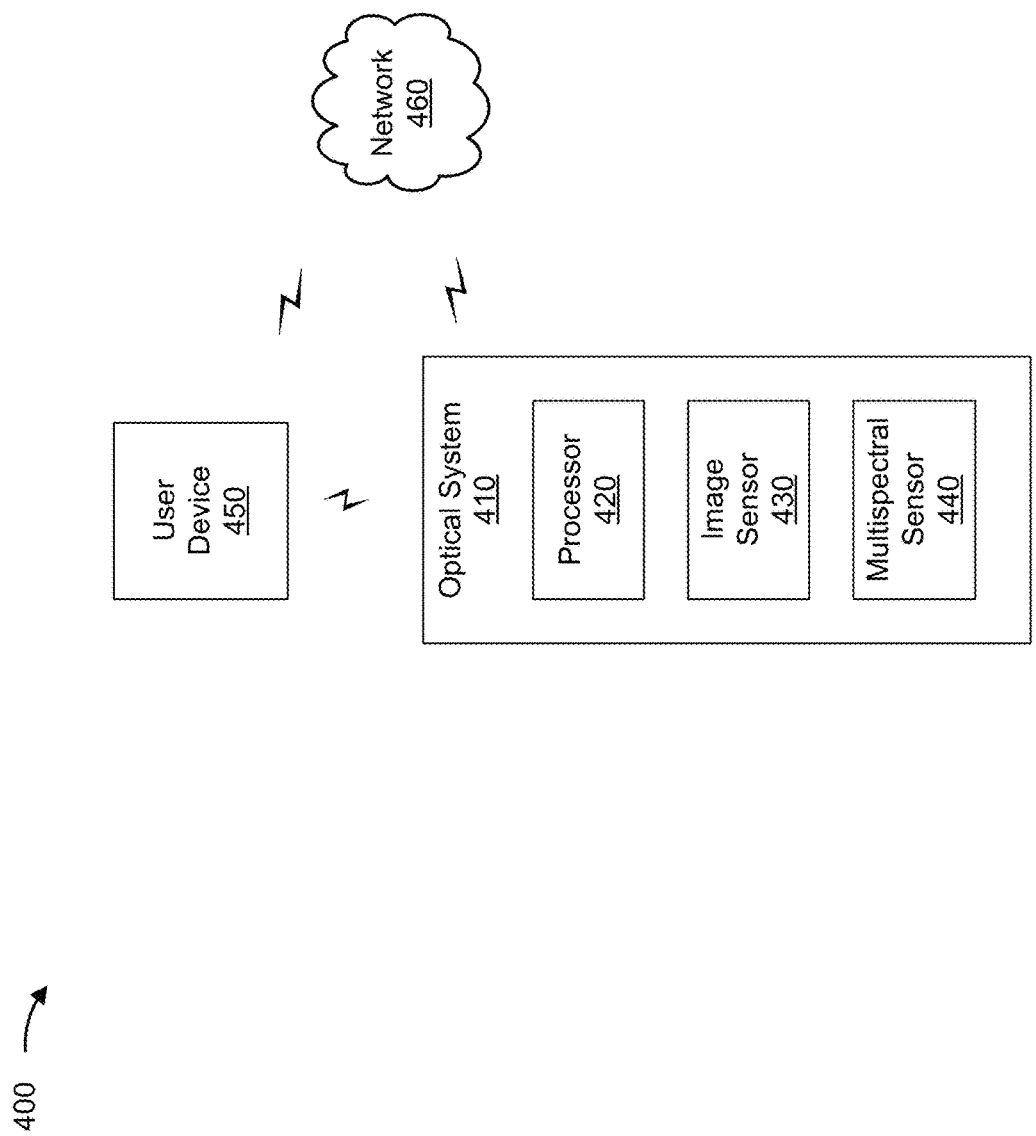
FIG. 4 is a diagram of an example environment in which systems and/or methods described herein may be implemented.

FIG. 4 is a diagram of an example environment 400 in which systems and/or methods described herein may be implemented. As shown in FIG. 4, the environment 400 may include an optical system 410, a processor 420, an image sensor 430, a multispectral sensor 440, a user device 450, and a network 460. Devices of the environment 400 may interconnect via wired connections, wireless connections, or a combination of wired and wireless connections.

As shown in FIG. 4, optical system 410 may comprise the processor 420, the image sensor 430, and/or the multispectral sensor 440. In some implementations, the optical system 410 may be included in the user device 450. The optical system 410 may correspond to the optical system 202 described herein.

The processor 420 is implemented in hardware, firmware, and/or a combination of hardware and software. The processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 420 includes one or more processors capable of being programmed to perform a function, such as to process image data and/or spectral data as described herein.

The image sensor 430 includes a device capable of sensing light (e.g., in the visible spectrum). For example, the image sensor 430 may include an image sensor, a multispectral sensor, and/or a spectral sensor, among other examples. In some implementations, the image sensor 430 may include a charge-coupled device (CCD) sensor, a complementary metal-oxide semiconductor (CMOS) sensor, a front-side illumination (FSI) sensor, a back-side illumination (BSI) sensor, and/or a similar sensor. In some implementations, the image sensor 430 may be included in a camera or a similar device. The image sensor 430 may correspond to the image sensor 212 described herein.

The multispectral sensor 440 includes a device capable of sensing light (e.g., in the visible spectrum and/or a nonvisible spectrum). For example, the multispectral sensor 440 may include an image sensor, a multispectral sensor, a spectral sensor, and/or the like. In some implementations, multispectral sensor 440 may include a CCD sensor, a CMOS sensor, an FSI sensor, a BSI sensor, and/or a similar sensor. In some implementations, the multispectral sensor 440 may be included in a camera or a similar device. The multispectral sensor 440 may correspond to the multispectral sensor 204 described herein.

The user device 450 includes one or more devices capable of receiving, generating, storing, processing, and/or providing information as described herein. For example, the user device 450 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, the user device 450 may receive information from and/or transmit information to optical system 410 (e.g., via the network 460).

The network 460 includes one or more wired and/or wireless networks. For example, the network 460 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
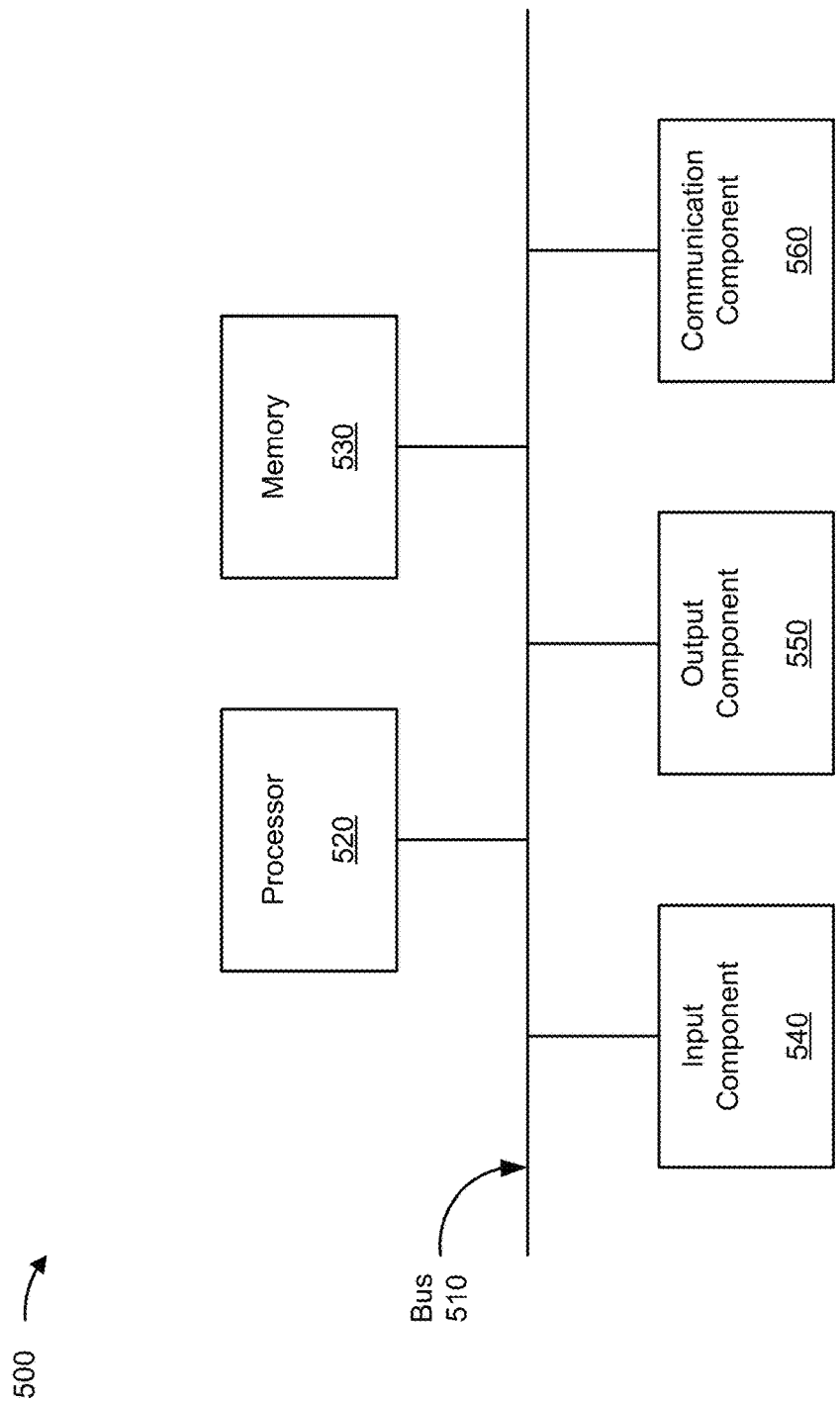
FIG. 5 is a diagram of example components of a device associated with an optical system.

FIG. 5 is a diagram of example components of a device 500 associated with an optical system. The device 500 may correspond to the optical system 410, the processor 420, the image sensor 430, the multispectral sensor 440, and/or the user device 450. In some implementations, the optical system 410, the processor 420, the image sensor 430, the multispectral sensor 440, and/or the user device 450 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
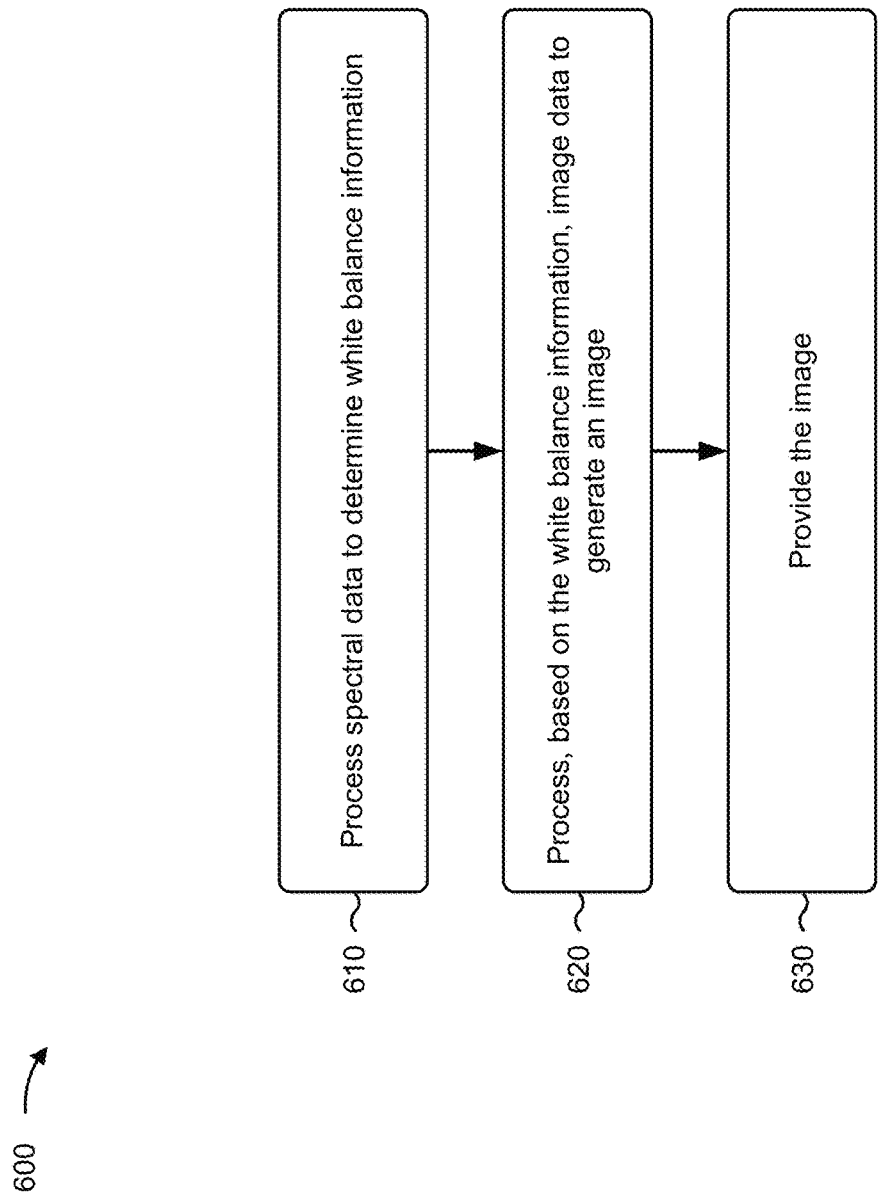
FIG. 6 is a flowchart of an example process relating to generating an image of a scene.

FIG. 6 is a flowchart of an example process 600 relating to generating an image of a scene. In some implementations, one or more process blocks of FIG. 6 may be performed by a system (e.g., optical system 410 and/or optical system 202). In some implementations, one or more process blocks of FIG. 6 may be performed by another device or a group of devices separate from or including the system, such as a processor (e.g., processor 420), an image sensor (e.g., image sensor 430), a multispectral sensor (e.g., multispectral sensor 440), and/or a user device (e.g., user device 450). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include processing spectral data to determine white balance information associated with a scene (block 610). For example, the system may process spectral data (e.g., that is generated by the multispectral sensor based on one or more portions of light that originates from a scene, and that propagates to the multispectral sensor via a lens and an optical filter), such as by using one or more white balance determination techniques, to determine white balance information associated with the scene. The white balance information may indicate an estimated illumination of the scene (e.g., by ambient light). In some implementations, the system may identify portions of the spectral data that are associated with a set of one or more "clear" optical channels of the optical filter and a set of one or more "darkened" optical channels of the optical filter to normalize, denoise, and/or otherwise process the spectral data. In this way, the system may generate white balance information that indicates a more accurate estimated illumination of the scene.

As further shown in FIG. 6, process 600 may include processing, based on the white balance information, image data to generate an image (block 620). For example, the system may process, based on the white balance information, image data (e.g., that is generated by the image sensor based on one or more portions of other light that originates from the scene) to generate an image. For example, the system may process the image data using a global illumination color correction technique, such as an AWB technique, based on the white balance information, to generate the image.

As further shown in FIG. 6, process 600 may include providing the image (block 630). For example, the system may provide the image, such as to a display screen of the user device. In this way, the image may be visually presented (e.g., via the display screen) and may appear (e.g., to a user of the user device) to be "color corrected."

Process 600 may include additional implementations, such as any single implementation or any combination of implementations described in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "X material" or "X solution," where X is a chemical composition, such as silicon nitride or niobium tantalum oxide, indicates that at least a threshold percentage of X is included in the X material or X solution. The threshold percentage may be, for example, greater than or equal to 1%, 5%, 10%, 25%, 50%, 75%, 85%, 90%, 95%, and/or 99%. As used herein, when a material or solution is referred to by a specific chemical name or formula, the solution or material may include non-stoichiometric variations of the stoichiometrically exact formula identified by the chemical name.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical system, comprising:
a multispectral sensor including a plurality of multispectral sensor elements;
an optical filter including a plurality of optical channels that is disposed over the multispectral sensor;
a lens that is disposed over the optical filter; and
an image sensor including a plurality of image sensor elements, wherein:
the lens is configured to direct non-focused light that originates from a scene to the optical filter and focused light that originates from the scene to the image sensor,
the optical filter is configured to pass one or more portions of the non-focused light to the multispectral sensor,
the multispectral sensor is configured to generate, based on the one or more portions of the non-focused light, spectral data associated with the scene, and
the image sensor is configured to generate image data based on the focused light.

2. The optical system of claim 1, wherein the plurality of optical channels of the optical filter includes:
a first set of one or more optical channels that are configured to have a first transmittance level that is greater than or equal to 90% for light associated with a spectral range; and
a second set of one or more optical channels that are configured to have a second transmittance level that is less than or equal to 7% for light associated with the spectral range.

3. The optical system of claim 2, wherein the spectral range is greater than or equal to 420 nanometers and less than 780 nanometers.

4. The optical system of claim 2, wherein the plurality of optical channels of the optical filter further includes:
one or more other sets of one or more optical channels, wherein a particular set, of the one or more other sets, is configured to have a particular transmittance level that is greater than or equal to 20% for light associated with a particular spectral subrange of the spectral range.

5. The optical system of claim 4, wherein each optical channel, of the first set, the second set, and the one or more other sets, comprises:
a first mirror;
a set of one or more spacer layers disposed on the first mirror; and
a second mirror disposed on the set of one or more spacer layers.

6. The optical system of claim 1, wherein the lens includes a first region and a second region, wherein:
the first region of the lens is configured to direct the non-focused light to the optical filter; and
the second region of the lens is configured to direct the focused light to the image sensor.

7. The optical system of claim 1, wherein the optical system further comprises at least one processor, wherein the at least one processor is configured to:
process the spectral data to determine white balance information associated with the scene; and
process, based on the white balance information, the image data to generate an image of the scene.

8. An optical system, comprising:
an optical filter including a plurality of optical channels that is disposed over a multispectral sensor; and
a lens that is disposed over the optical filter, wherein:
the lens is configured to direct non-focused light that originates from a scene to the optical filter and focused light that originates from the scene to an image sensor, and
the optical filter is configured to pass one or more portions of the non-focused light to the multispectral sensor to permit the multispectral sensor to generate spectral data associated with the scene that can be used to determine white balance information associated with the scene.

9. The optical system of claim 8, wherein each optical channel, of the plurality of optical channels, comprises:
   a first mirror;
   a set of one or more spacer layers disposed on the first mirror; and
   a second mirror disposed on the set of one or more spacer layers.

10. The optical system of claim 8, wherein the plurality of optical channels of the optical filter includes:
   a first set of one or more optical channels that are configured to have a first transmittance level that is greater than or equal to 90% for light associated with a spectral range; and
   a second set of one or more optical channels that are configured to have a second transmittance level that is less than or equal to 7% for light associated with the spectral range.

11. The optical system of claim 10, wherein the plurality of optical channels of the optical filter further includes:
   one or more other sets of one or more optical channels, wherein a particular set, of the one or more other sets, is configured to have a particular transmittance level that is greater than or equal to 20% for light associated with a particular spectral subrange of the spectral range.

12. The optical system of claim 8, wherein the image sensor is configured to generate, using the focused light, image data associated with the scene that can be used to generate, in association with the white balance information associated with the scene, an image of the scene.

13. The optical system of claim 8, wherein the lens includes a first region and a second region, wherein:
   the first region of the lens is configured to direct the non-focused light to the optical filter; and
   the second region of the lens is configured to direct the focused light to the image sensor.

14. An optical filter, comprising:
   a plurality of optical channels that includes:
      a first set of one or more optical channels that are configured to have a first transmittance level that is greater than or equal to 90% for light associated with a spectral range;
      a second set of one or more optical channels that are configured to have a second transmittance level that is less than or equal to 7% for light associated with the spectral range; and
      a plurality of other sets of one or more optical channels, wherein a particular set, of the plurality of other sets, are configured to have a particular transmittance level that is greater than or equal to 20% for light associated with a particular spectral subrange of the spectral range, and
      wherein the optical filter is configured to pass one or more portions of non-focused light that originates from a scene and is directed by a lens to the optical filter while focused light that originates from the scene and is directed by the lens to an image sensor.

15. The optical filter of claim 14, wherein the spectral range is greater than or equal to 420 nanometers and less than 780 nanometers.

16. The optical filter of claim 14, wherein each optical channel, of the first set, the second set, and the plurality of other sets, comprises:
   a first mirror;
   a set of one or more spacer layers disposed on the first mirror; and
   a second mirror disposed on the set of one or more spacer layers.

17. The optical filter of claim 14, wherein the first set, the second set, and the plurality of other sets are arranged in a non-periodic, two-dimensional pattern.

18. The optical filter of claim 16, wherein at least one of the first mirror or the second mirror is a dielectric mirror.

19. The optical system of claim 8, wherein the optical system further comprises at least one processor configured to:
   process the spectral data to determine the white balance information.

20. The optical system of claim 19, wherein the optical system further comprises at least one processor configured to:
   generate an image of the scene based on the white balance information.

* * * * *